United States Patent [19]

Snoke et al.

[11] Patent Number: 4,830,386
[45] Date of Patent: May 16, 1989

[54] AUTOMOBILE HARDTOP STORAGE RACK

[75] Inventors: Phillip J. Snoke, Atlanta; Frank B. Golley, Decatur, both of Ga.

[73] Assignee: Atlanta Motoring Accessories, Inc., Norcross, Ga.

[21] Appl. No.: 28,745

[22] Filed: Mar. 23, 1987

Related U.S. Application Data

[63] Continuation-in-part of Ser. No. 911,631, Sep. 25, 1986.

[51] Int. Cl.[4] .............................................. B62B 3/10
[52] U.S. Cl. ...................................... 280/38; 211/196;
280/42; 280/79.4; D34/17
[58] Field of Search ...................... 280/79.1 A, 79.1 R,
280/79.3, 47.34, 39, 38, 42, 33.99 H, 655, 659,
47.26, 641, 47.2, 47.29, 33.99 R, 651; D34/23,
24, 17; D12/156; 211/13, 196, 205, 41, 189

[56] References Cited

U.S. PATENT DOCUMENTS

| 232,625 | 9/1974 | Shiftlet ............................ | D12/25 |
|---|---|---|---|
| 237,597 | 11/1975 | Clarke et al. ..................... | D12/25 |
| D. 265,517 | 7/1982 | Dunchock ......................... | D34/17 |
| D. 288,739 | 3/1987 | Johnson et al. .................... | D34/23 |
| 1,441,264 | 12/1921 | Breuwer ............................ | 248/119 |
| 2,377,023 | 9/1942 | Milburn et al. .................... | 248/119 |
| 2,466,149 | 1/1945 | Burg ................................. | 280/79.3 |
| 2,681,233 | 9/1951 | Smith ............................... | 280/79.3 |
| 2,716,557 | 8/1955 | Gould et al. ...................... | 280/47.34 |
| 2,916,293 | 12/1959 | Lang ................................ | 280/33.99 T |
| 2,980,438 | 8/1958 | Baer ................................ | 280/79.3 |
| 3,224,787 | 9/1963 | Andersen .......................... | 280/33.99 H |
| 3,540,753 | 11/1970 | Hanson ............................ | 280/47.34 |
| 3,693,996 | 9/1972 | Hardy .............................. | 280/47.34 |
| 3,746,358 | 7/1973 | Swick, Jr. et al. ................ | 280/79.3 |
| 3,920,258 | 11/1975 | Lundstrom et al. .............. | 280/33.99 H |
| 3,946,876 | 4/1976 | Jay .................................. | 211/60 R |
| 3,953,047 | 4/1976 | Morgan ............................ | 280/639 |
| 4,159,110 | 6/1979 | Dodenhoff ........................ | 280/42 |
| 4,326,726 | 4/1982 | Dunchock ........................ | 280/79.1 A |
| 4,591,183 | 5/1986 | Gordon et al. ................... | 280/47.29 |

FOREIGN PATENT DOCUMENTS

| 1078750 | 3/1960 | Fed. Rep. of Germany ........ | 280/38 |
|---|---|---|---|
| 1505777 | 4/1969 | Fed. Rep. of Germany ...... | 280/659 |

Primary Examiner—David M. Mitchell
Attorney, Agent, or Firm—Thomas & Kennedy

[57] ABSTRACT

A storage rack for storing removable automobile hardtops includes a vertical frame member and a pair of horizontal frame members pivotably mounted to the lower end of the vertical frame member for arcuate movement in a substantially horizontal plane. A lower edge of the hardtop rests on the forward end of the horizontal members abutting vertical cleats, and the upper edge of the top leans rearwardly against the upper end of the vertical member. A strap biases the top into abutment with the storage frame, and wheel means support the storage frame for rolling movement. A fabric dust cover encloses the rack and hardtop mounted thereon during storage.

6 Claims, 3 Drawing Sheets

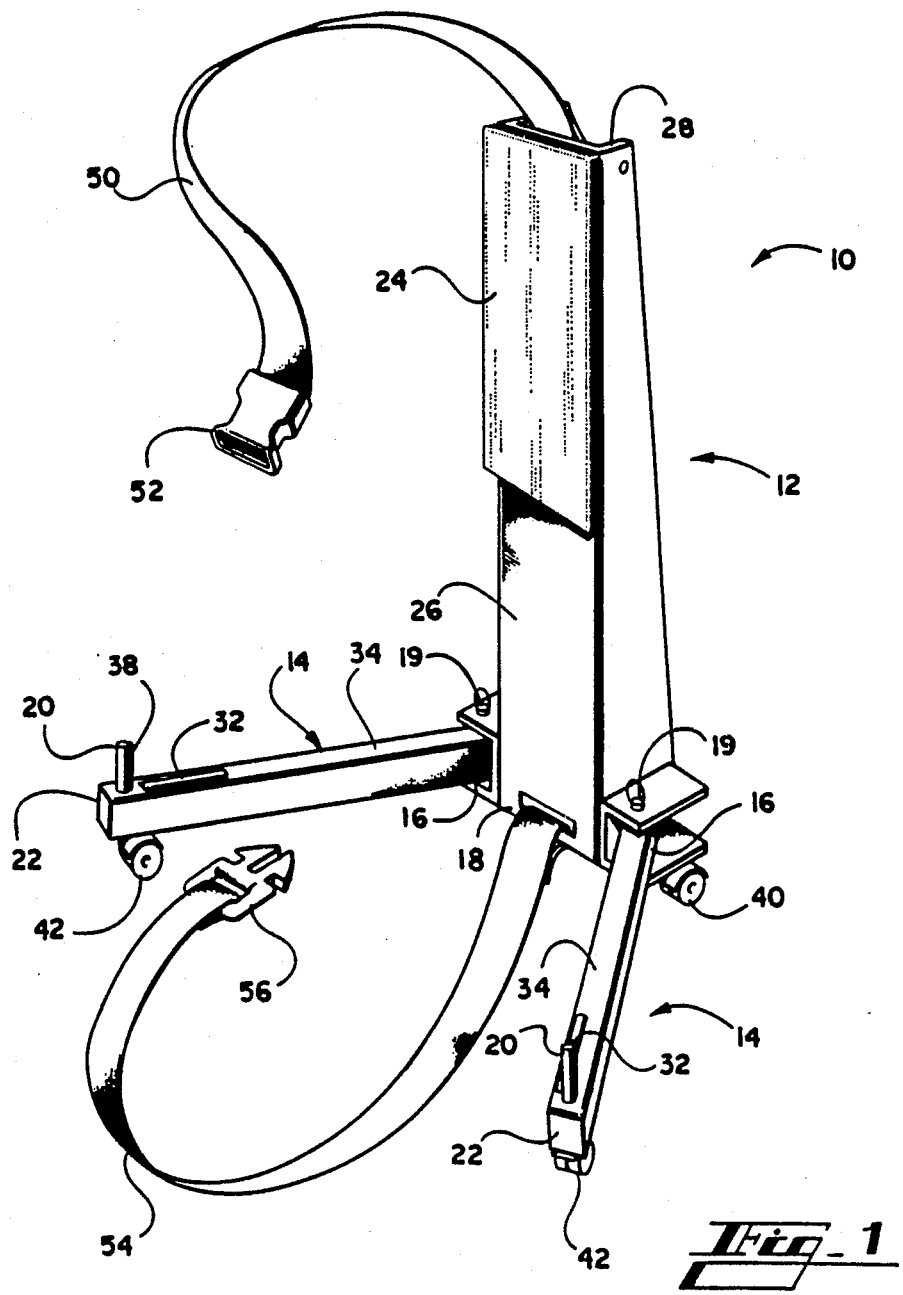

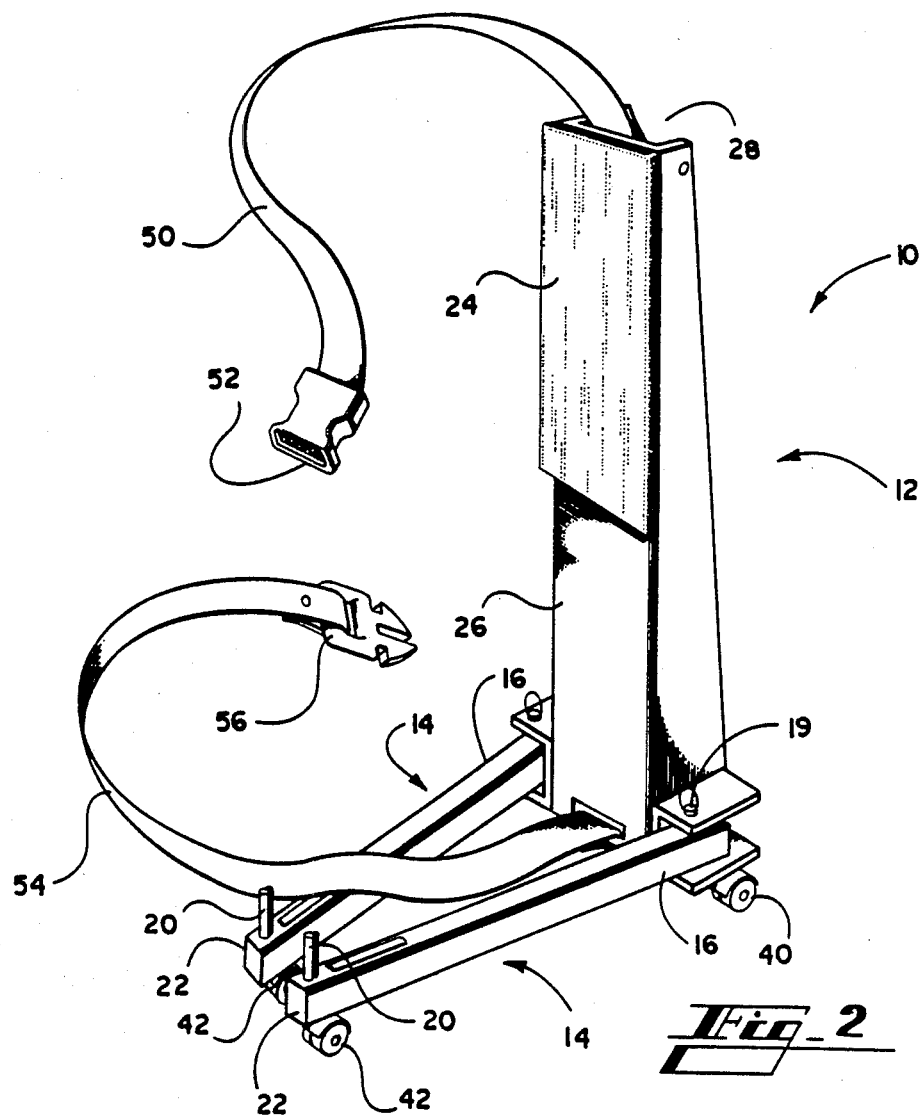
Fig_2

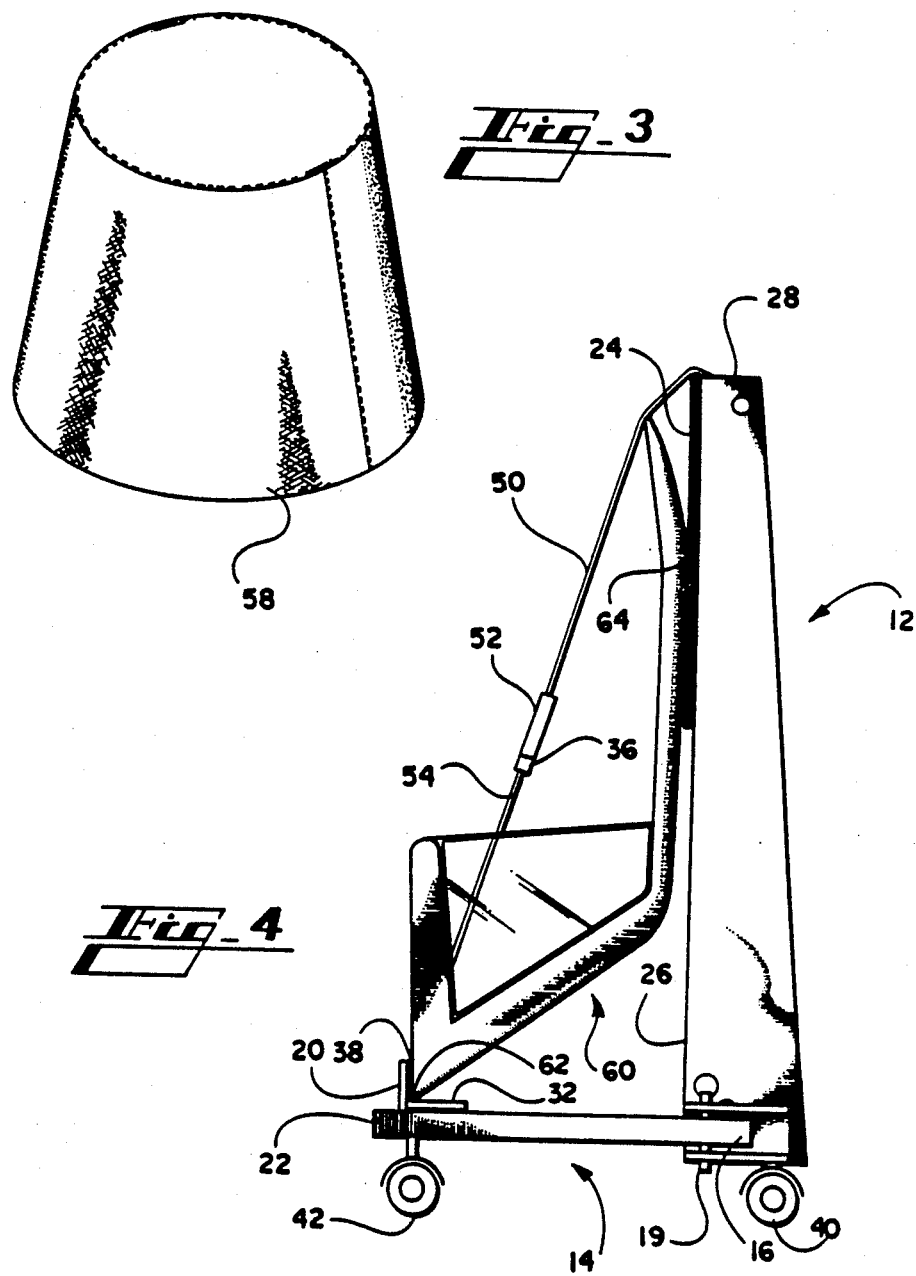

AUTOMOBILE HARDTOP STORAGE RACK

CROSS-REFERENCE TO RELATED APPLICATION

This application is a continuation in part of U.S. Design application Ser. No. 911,631, filed Sept. 25, 1986.

TECHNICAL FIELD

The present invention relates generally to storage racks, and relates more specifically to a storage rack for storing a removable automobile hardtop.

BACKGROUND OF THE INVENTION

Automobiles are known which have removable hardtops releasably secured to the automobile body and selectively removable to afford the conveniences of a convertible. Examples of such automobiles with removable hardtops are various models manufactured by Mercedes and Jaguar, the Chevrolet Corvette, and the Cadillac Allente.

Once the owner of such an automobile has removed the hardtop, he is then faced with the problems of storing the hardtop and of transporting the hardtop to and from its storage location. Often, a removed hardtop is stored standing on its edge in an upright position in a corner of the garage. However, since such removable hardtops are very expensive, care must be taken to transport and store the removed hardtop in such a manner as not to damage the windows, exterior painted surfaces, or interior matted surfaces while the top is removed.

Accordingly, there is a need to provide an apparatus for storing and transporting a removable automobile hardtop.

Storage racks for moving and storing such removable hardtops are known in the art. An example of one such storage rack is disclosed in U.S. Pat. No. 4,326,726 to Dunchock. That rack comprises a frame having an elongated rectangular base, a pair of upright frame members projecting vertically from the rear corners of the rectangular frame, and a pair of inclined side members extending from the front corners of the rectangular frame upwardly and rearwardly to a point on the upright frame members spaced downwardly from their upper ends. The side members and vertical members thus form an angle contoured to abut and support a rear wall and a top wall of the automobile top placed on the rack for storage. The frame is mounted on a plurality of casters to permit the frame to be rolled from place to place. While the storage rack of the aforementioned U.S. Pat. No. 4,326,726 adequately protects and transports a hardtop placed therein for storage, it suffers the disadvantage of being bulky and occupying considerable space even when not in use.

Accordingly, there is a need to provide a storage rack for storing, protecting, and transporting removable automobile hardtops which will occupy a minimum of space when not in use.

SUMMARY OF THE INVENTION

As will be seen, the present invention overcomes these and other disadvantages associated with prior art automobile hardtop storage racks. Stated generally, the present invention comprises a foldable rack for storing a removable automobile hardtop. The rack protects the removable hardtop and facilitates movement of the top from one location to another. When not in use, the storage rack occupies substantially less space than prior art storage racks.

Stated more specifically, the storage rack of the present invention comprises a vertical frame member and a pair of horizontal frame members, the back end of each horizontal frame member being pivotably mounted to the bottom of the vertical frame member for arcuate movement of the horizontal frame members in a substantially horizontal plane. Vertical cleats project upwardly from the front end of the horizontal frame members. Casters are provided for supporting the rack for rolling movement. With the horizontal frame members pivoted to their extended position, the lower edge of the hardtop is placed on top of the horizontal frame members at their front ends and abutting the cleats to prevent the top from slipping. The top is then leaned rearwardly until its upper edge contacts the vertical frame member at a point proximate to its upper end. An adjustable strap biases the top into abutment with the frame. When not in use, the horizontal frame members can be folded together so as to occupy a minimum amount of floor space.

Thus, it is an object of the present invention to provide an improved storage rack for storing a removable automobile hardtop.

It is a further object of the present invention to provide a storage rack which occupies a minimum of floor space when not in use.

Other objects, features, and advantages of the present invention will become apparent upon reading the following specification, when taken in conjunction with the drawings and the appended claims.

BRIEF DESCRIPTION OF THE DRAWINGS

FIG. 1 is a perspective view of an automobile hardtop storage rack according to the present invention, with its horizontal members unfolded to an extended configuration.

FIG. 2 is a perspective view of the storage rack of FIG. 1 with its horizontal members folded to a stored configuration.

FIG. 3 is a perspective view of an optional fabric dust cover for use with the storage rack of FIG. 1.

FIG. 4 is a side view of the storage rack of FIG. 1 with an automobile hardtop stored thereon.

DETAILED DESCRIPTION OF THE DISCLOSED EMBODIMENT

Referring now in more detail to the drawings, in which like numerals indicate like elements throughout the several views, FIG. 1 shows a storage rack 10 for storing removable automobile hardtops. The storage rack 10 includes a vertical frame member 12 and a pair of horizontal frame members 14. The rear end 16 of each horizontal member 14 is pivotably mounted to the lower end 18 of the vertical frame member 12 by a pivot pin 19. When mounted as described, the horizontal frame members 14 are each pivotable through an arc of approximately 30° in a substantially horizontal plane relative to the vertical frame member 12. In this manner, the horizontal frame members can be closed together, or can be opened to form an angle of approximately 60°. Cleats 20 project vertically upwardly from the front ends 22 of the horizontal frame members 14.

A cushioned strip 24 is applied to the forward face 26 of the vertical frame member 12 at a point proximate its upper end 28. Smaller cushion strips 32 are applied on the upper surface 34 of the horizontal frame members 14 adjacent to the cleats 20, and similar cushion strips 38 are affixed to the rear of each cleat 20. In this manner, when an automobile hardtop is mounted on the storage rack in the manner hereinbelow described, all of the surfaces of the storage rack 10 which contact the hardtop are cushioned to prevent the painted surfaces of the hardtop from being scratched or nicked.

A pair of pivotable casters 40 mounted for rotation at the lower end 18 of the vertical frame member 12 supports the storage rack for rolling movement. In a similar manner, pivotable casters 42 mounted beneath the front end 22 of each horizontal frame member 14 further support the storage rack 10 for rolling movement.

An upper strap 50 has a buckle element 52 formed at one end, the other end of the strap being secured to the upper end 28 of the vertical frame member 12. In a similar manner, a lower strap 54 has a mating buckle element 56 attached to one end, with the other end of the strap being secured to the lower end 18 of the vertical frame member 12. The straps are formed from a non-extensible material such as canvas, polypropylene, or the like. The position of the buckle element 52 is adjustable with respect to its strap 50 in the well-known manner to lengthen or shorten the straps as may be necessary to accomodate a hardtop mounted on the storage rack 10, as will be hereinbelow explained.

The storage rack shown in FIG. 1 is in an extended configuration, ready to receive an automobile hardtop for storage thereon. In this extended configuration, the horizontal frame members 14 are unfolded to form an angle of approximately 60°. In contrast, FIG. 2 shows the storage rack 10 in a retracted configuration, with the horizontal frame members 14 folded together. In the retracted configuration, the storage rack has a very narrow "footprint" and occupies a minimum of floor space, such that it can easily be stored against a wall out of the way when not in use.

FIG. 3 shows an optional fabric dust cover 58 dimensioned to encase the storage rack 10 and automobile hardtop mounted thereto. If desired, such dust cover can be provided of a waterproof material to permit the storage rack and hardtop to be stored outdoors.

Referring now to FIG. 4, to use the automobile hardtop storage rack 10 of the present invention, the user first pivotably unfolds each of the horizontal frame members 14 to their extended configuration. The hardtop 60 is removed from the automobile, and a lower edge 62 of the hardtop is placed on the cushion strips 32 on the upper surface 34 of the horizontal frame members 14 and abutting the cushion strips 38 on the cleats 20. The hardtop 60 is then leaned rearwardly until its upper edge 64 abuts the cushion strip 24 on the front face 26 of the vertical frame member 12. The straps 50, 54 are buckled around the hardtop 60 and adjusted as may be necessary to bias it against the storage frame 10.

With the top 60 thus secured to the storage rack 10, the rack and hardtop mounted thereto can be rolled to another location for storage. All of the portions of the storage rack 10 which contact the hardtop are padded with the cushion strips 24, 32, and 38 to prevent the exterior painted surfaces of the hardtop from being nicked or scratched. If desired, the optional fabric dust cover 58 can be employed to encase the storage rack 10 and hardtop 60 mounted thereto and further protect the finish of the hardtop.

An important feature of the present invention is the pivotable mounting of the horizontal frame members 14 such that they are capable of pivoting between their extended and retracted configurations. The advantage of this feature is that the retracted storage rack has a small "footprint" and thus occupies a minimum of floor space. The storage rack can therefore be easily stored out of the way against a wall when not in use.

While the preferred embodiment of the invention is disclosed with respect to a storage rack having adjustable straps 50, 54 of a non-extensible material, such as canvas, polypropylene, or the like, it will be appreciated that elastic straps may be provided. Or, the straps may be removed altogether, permitting the hardtop to just lean upon the rack and be biased into contact with the storage rack by force of gravity.

Finally, it will be understood that the preferred embodiment of the present invention has been disclosed by way of example, and that other modifications may occur to those skilled in the art without departing from the scope and spirit of the appended claims.

What is claimed is:

1. A rack for storing removable automobile hardtops and the like, comprising:

a vertical frame member, and a pair of horizontal frame members, the rear end of each horizontal frame member being pivotably mounted to the lower end of said vertical frame member for arcuate movement of said horizontal frame members in a substantially horizontal plane, the vertical and horizontal frame member bounding an open space in which an automobile hardtop may be positioned supported upon said vertical and horizontal frame members, the front end of each horizontal frame member having a vertical cleat projecting upwardly therefrom, whereby the rack may be compactly configured for storage with the horizontal frame members folded together and configured for use with the horizontal frame members extended apart to support an automobile hardtop set upon the horizontal frame members against the vertical frame member.

2. The automobile hardtop storage rack of claim 1, further comprising wheel means supporting said rack for rolling movement along a support surface.

3. The automobile hardtop storage rack of claim 1, further comprising cushion means attached to the upper end of said vertical member and to the upper surfaces of said front ends of said horizontal frame members adjacent to said vertical cleats.

4. The automobile hardtop storage rack of claim 1, further comprising adjustable strap means for biasing an automobile hardtop into abutment with said storage rack.

5. The automobile hardtop storage rack of claim 1, further comprising a fabric dust cover for enclosing said rack and hardtop mounted thereon.

6. The automobile hardtop storage rack of claim 1 wherein said vertical frame member has a selected width, and wherein said horizontal frame members are pivotably mounted to the lower end of said vertical frame member for arcuate movements between extended positions with ends of said horizontal frame members located distally said vertical frame member spaced apart a distance substantially greater than said selected width and a retracted position with said horizontal frame member ends located sufficiently close together so as to have a combined width not substantially exceeding said selected width.

* * * * *